(12) United States Patent
Gist

(10) Patent No.: US 8,215,657 B1
(45) Date of Patent: Jul. 10, 2012

(54) LOAD BEARING DOLLIES

(76) Inventor: Richard T. Gist, Tulare, CA (US)

( * ) Notice: Subject to any disclaimer, the term of this patent is extended or adjusted under 35 U.S.C. 154(b) by 410 days.

(21) Appl. No.: 12/587,181

(22) Filed: Oct. 5, 2009

(51) Int. Cl.
*B62D 53/08* (2006.01)

(52) U.S. Cl. .................................. 280/476.1; 280/460.1

(58) Field of Classification Search ............... 280/476.1, 280/460.1
See application file for complete search history.

(56) References Cited

U.S. PATENT DOCUMENTS

| | | | | |
|---|---|---|---|---|
| 2,458,666 | A * | 1/1949 | Williams | 280/405.1 |
| 4,848,783 | A * | 7/1989 | Christenson et al. | 280/405.1 |
| 5,348,332 | A * | 9/1994 | Hamilton | 280/476.1 |
| 5,370,196 | A * | 12/1994 | Bishop | 180/24.02 |
| 5,540,454 | A * | 7/1996 | VanDenberg et al. | 280/81.1 |
| 5,549,322 | A * | 8/1996 | Hauri | 280/86.5 |
| 5,626,356 | A * | 5/1997 | Harwood | 280/405.1 |
| 6,290,248 | B1 * | 9/2001 | Yrigoyen | 280/476.1 |
| 6,733,028 | B2 * | 5/2004 | Teeple | 280/476.1 |
| 7,497,457 | B2 * | 3/2009 | Jamieson | 280/460.1 |
| 7,740,265 | B2 * | 6/2010 | Lundin | 280/476.1 |
| 7,934,743 | B1 * | 5/2011 | Wall et al. | 280/476.1 |
| 2003/0102649 | A1 * | 6/2003 | Teeple | 280/476.1 |
| 2007/0126196 | A1 * | 6/2007 | Klahn | 280/86.5 |
| 2007/0200316 | A1 * | 8/2007 | Jamieson | 280/476.1 |
| 2010/0001489 | A1 * | 1/2010 | Lundin | 280/476.1 |

* cited by examiner

*Primary Examiner* — Lesley D Morris
*Assistant Examiner* — Michael Stabley
(74) *Attorney, Agent, or Firm* — Dennis B. Haase

(57) ABSTRACT

A dolly to, inter alia, provide load support to a tractor trailer rig in which the dolly may be selectively attached to the tractor or the trailer as a means of engaging a second trailer. A coupling assembly in which the engaging vehicle, whether tractor or trailer, includes a transverse locking bar disposed at an acute angle to the direction of movement, which is selectively coupled to the dolly having a plate disposed at substantially a same acute angle as the transverse locking bar, wherein the plate includes a channel adapted to receive the locking bar, and the dolly having an air bag suspension system engaged with the air system of the tractor, wherein the pumping up of the air bag suspension system secures the locking bar in the channel.

8 Claims, 4 Drawing Sheets

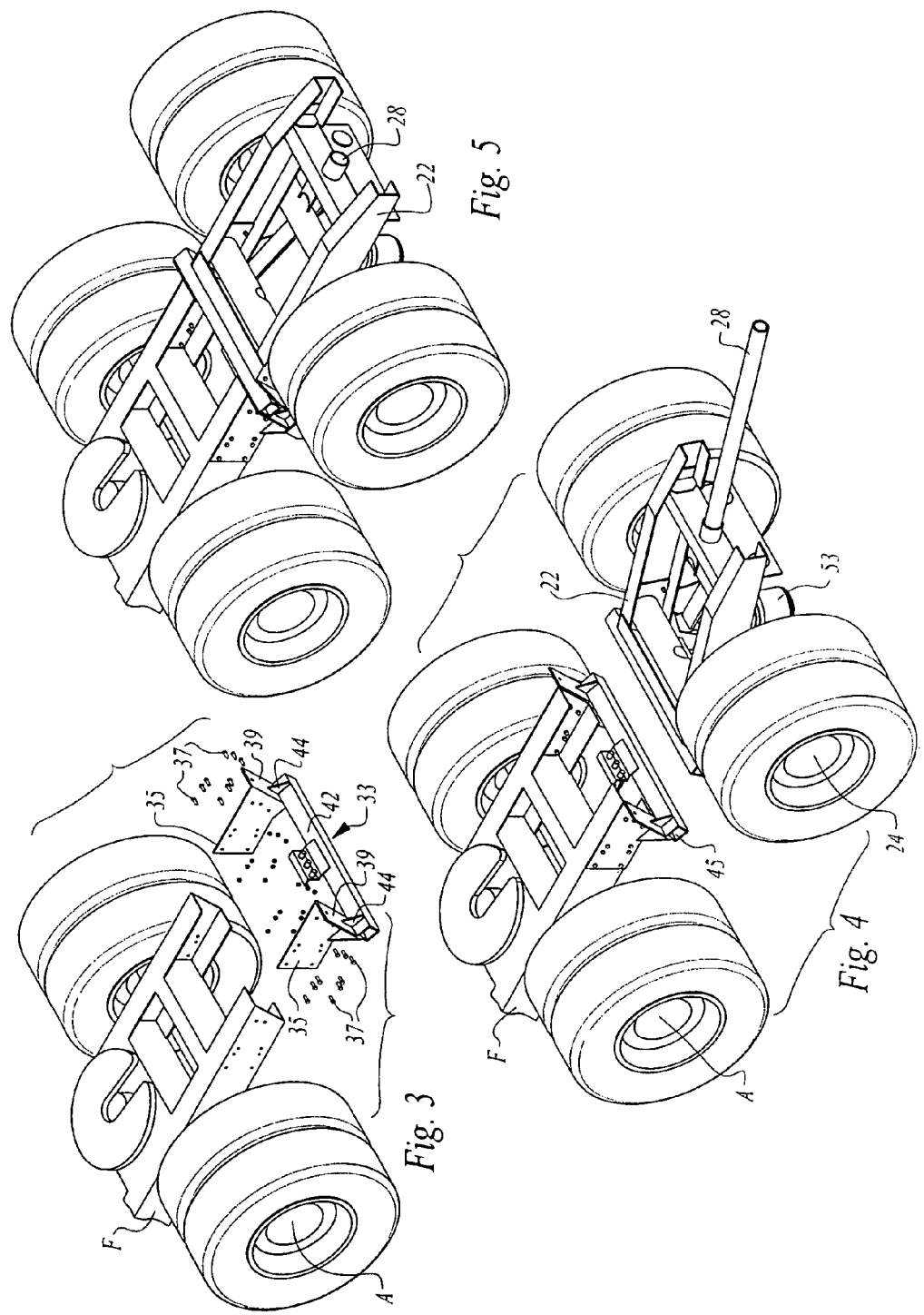

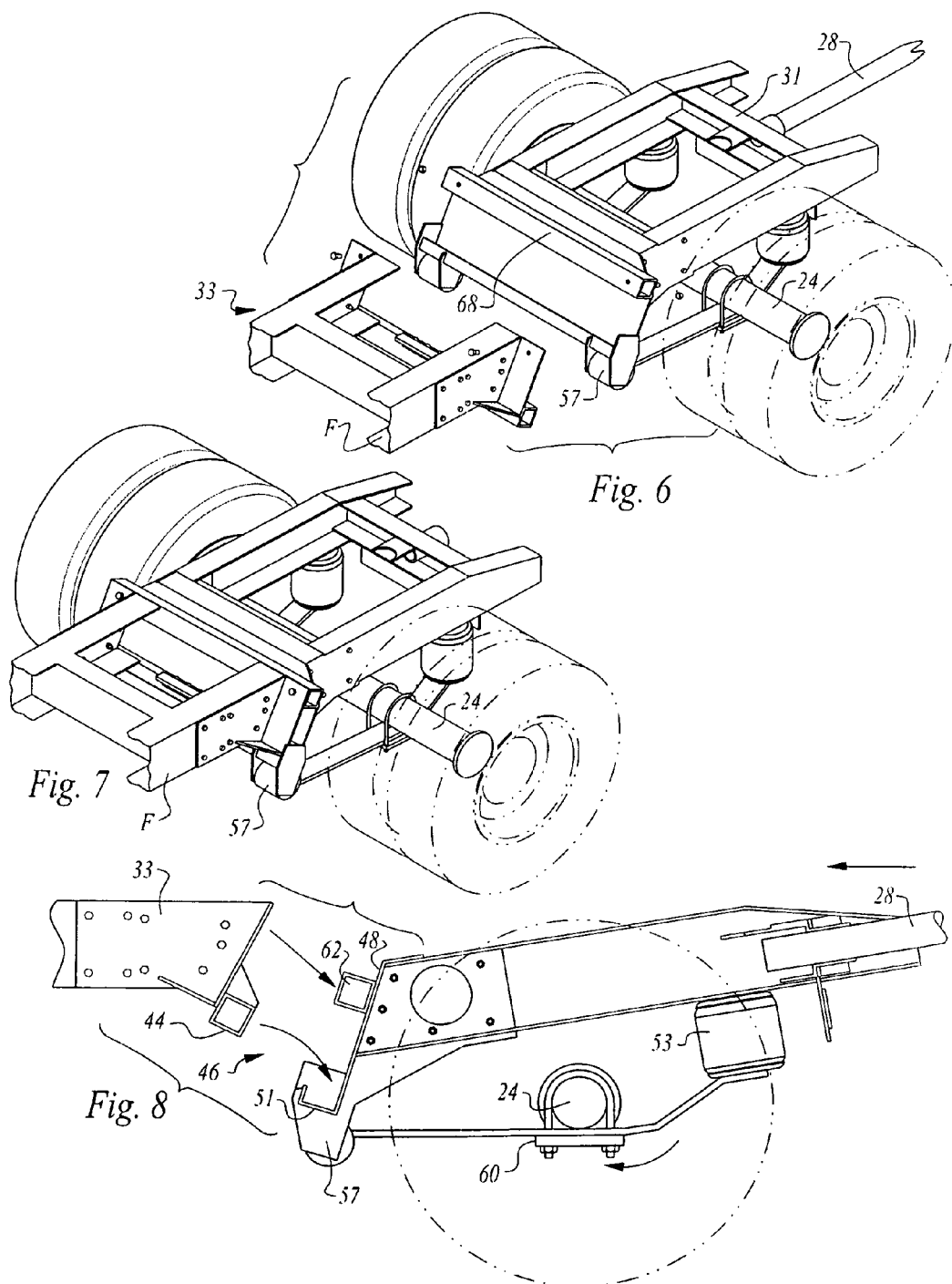

LOAD BEARING DOLLIES

The present invention relates, in a general sense, to auxiliary devices for use by large over the road trucks with heavy trailers and, more particularly, to load bearing dollies selectively attachable to a tractor and capable of providing supplemental support for a loaded trailer being hauled thereby.

BACKGROUND OF THE INVENTION

1. Field of the Invention

Tractor trailer assemblies, or big rigs, as they are often referred to, are designed and built to carry the loads allowed by law and more. Those loads may vary to from state to state, but typically do not vary greatly from the rules established by the Federal Department of Transportation.

While a load may be within the legal limit, its character may result in an imbalance which often overloads one axle as opposed to another. For example, if the load is particulate material, e.g., grains, it tends to shift forward as the rig brakes. Since the rig will necessarily accelerate slowly, such a load is much less likely to shift toward the rear.

The use of devices which add an additional axle to the tractor trailer rig have been known for more than 40 years. Such devices, sometimes referred to as dollies, have a variety of uses, including, but not limited to, adding a load bearing axle to a tractor and to permit a coupling for the towing of a rear trailer or pup. The actual coupling of the dolly is a source of difficulty. It is essential that the coupling is sufficiently firm so as to permit the driver to control it while in motion and sufficiently simple as to permit free use of the fifth wheel secured to the frame of the tractor when the dolly is secured thereto.

It is the intent and purpose of the present invention to provide a dolly which is readily controlled by the driver of a rig and which will supplement the load bearing capacity of an axle which may otherwise become overloaded.

2. Overview of the Prior Art

The existence and use of dollies by the trucking industry is somewhat common, although not in extensive use. In some instances it is used to convert a two axle tractor to a three axle tractor, primarily to add to the load bearing capacity of the rig. In other instances, dollies provide the means of hooking up a second trailer behind the trailer engaged at the tractor. While similar in use, the dolly of the present invention offers the trucking industry heretofore unavailable control and versatility.

Exemplary of what is currently available to the industry is the 1966 patent to Fontaine, U.S. Pat. No. 3,413,015. Fontaine is one of several attached dollies, including, but not limited to Neff et al. U.S. Pat. No. 3,827,723; Cunha U.S. Pat. No. 3,476,405; Barker et al. U.S. Pat. No. 3,421,778, and Lankenau U.S. Pat. No. 3,764,164, all of which employ a tongue and eye system for engagement with the tractor of a rig, or the trailer being towed thereby.

While Fontaine offers guide members in an attempt to stabilize the tongue, in general, the use of a tongue and eye potentially involves considerable lack of stability and is difficult to hook up. While the referenced patents are vintage 60's and 70's, the tongue and eye concept is current today.

SUMMARY OF THE INVENTION

With the foregoing by way of environment, it will be appreciated that it is an objective of the present invention to provide a dolly for use in conjunction with a big rig, which provides superior control of the dolly during use.

It is another object of the present invention to provide a dolly assembly that presents a novel engagement system which facilitates hook up with the dolly, whether directly to the tractor of a big rig, or a trailer already in tow therewith. It is an objective related to the foregoing, to provide an improved dolly which, when engaged, provides optimum balance and distribution of loading on the trailer.

Other and further objectives and advantages of the dolly of the present invention will become apparent to those skilled in the art when read in concert with the accompanying Detailed Description of a Preferred Embodiment supported by the drawings, wherein:

BRIEF DESCRIPTION OF THE DRAWINGS

FIG. 3 is a perspective of the tractor of FIG. 1, illustrating the rear axle portion with the mounting assembly for the dolly of the present invention in disassembly;

FIG. 4 is a pictorial representation of the rear axle of a tractor about to couple with a dolly of the present invention;

FIG. 5 is an illustration similar to FIG. 4, except coupling has taken place;

FIG. 6 is a pictorial representation of the dolly of the present invention, shown in perspective, and illustrating details of the various elements of the mounting system;

FIG. 7 is a perspective view of the dolly of the present invention with the mounting system component which attaches to the tractor in its coupled position with the mating component of the dolly;

FIG. 8 is a side elevation view of the components of the mounting system illustrating how they come together to secure the dolly to the tractor;

DETAILED DESCRIPTION OF A PREFERRED EMBODIMENT

Figure 1:
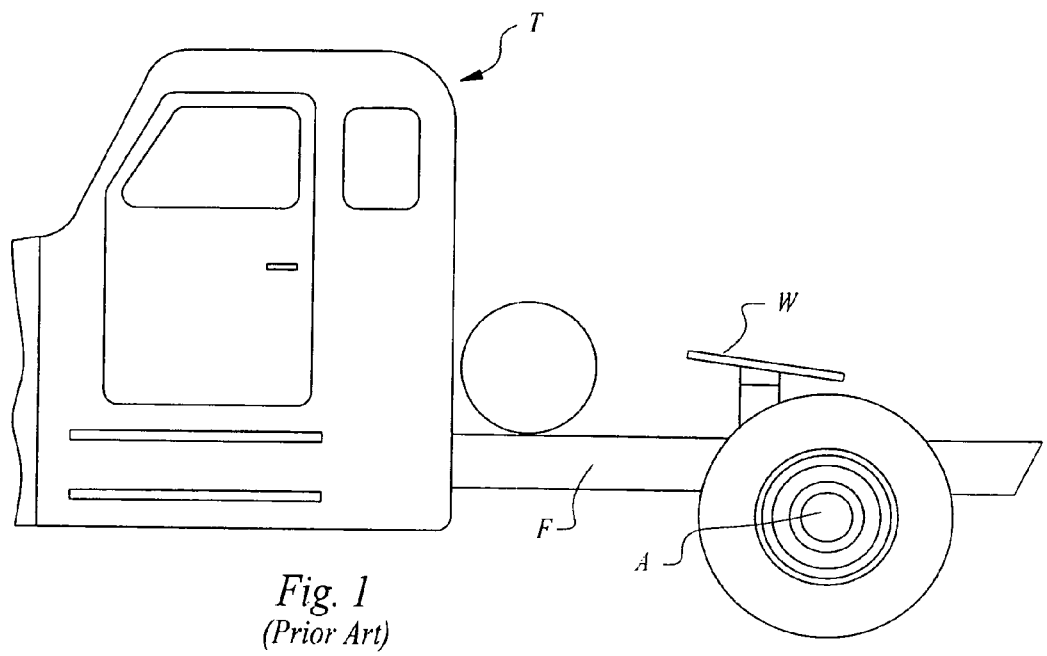
FIG. 1 is a pictorial representation of a typical tractor of the type used to pull one or more trailers, and commonly associated with the term big rig.
Figure 2:
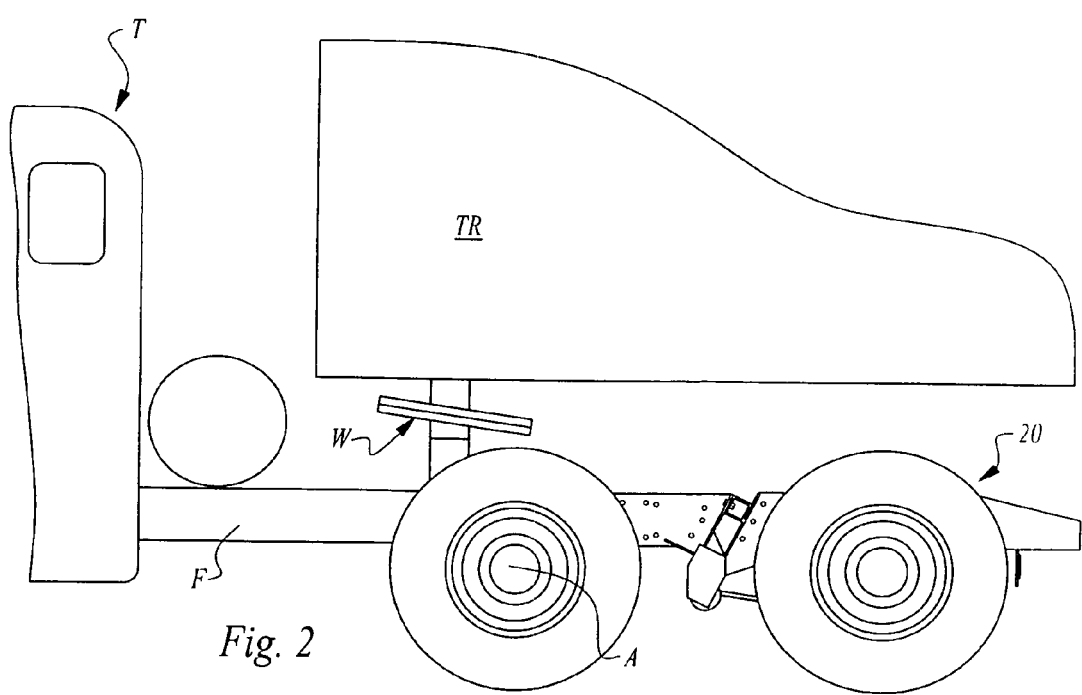
FIG. 2 is a pictorial representation of a portion of the tractor of FIG. 1, shown in side elevation, with a trailer engaged with the fifth wheel of the tractor and a dolly constructed in accordance with the present invention engaged.

With reference now to the drawings, and initially to FIGS. 1 and 2, and by way of establishment of the environment in which the invention has particular, although not exclusive, utility, there is a tractor-trailer rig in which the tractor T is represented as having a frame F, including a fifth wheel W, and supported in part by at least one rear axle A. It will be appreciated that the tractor is a depiction only of what is intended to be typical of the tractor of a tractor-trailer assembly commonly referred to as a big rig. It will also be understood that while a single rear axle is shown, a dual rear axle is available and is within the contemplation of the invention.

Referring to FIG. 2, it will be seen that the rig includes a trailer TR engaged with the tractor on its fifth wheel mounted to the frame thereof in a well known manner. As a means of providing auxiliary load support for the trailer, a dolly 20, constructed in accordance with the present invention, is in accordance with the invention selectively engaged with, and secured to, the tractor frame F which extends rearwardly of the rear axle of the trailer.

The basic structure of the dolly 20 is featured in FIGS. 3 through 7 and includes a box frame 22 seated on an axle 24 which is supported on a set of dual wheels 26 at the remote ends of the axle 24. A poll 28 is affixed to a cross member 31 of the box frame 22 to provide a means of manually manipulating the dolly, e.g., into and out of position, vis-a-vis the tractor.

In achieving the objectives of the invention, a novel coupling assembly is provided, the various elements of which are best detailed in FIGS. 3, 6 and 8. The coupling assembly is constructed with two compatible parts, one of which, the male component 33, is illustrated in FIG. 3, and is secured to the tractor at the rear of its frame F.

The male component 33 is comprised of a pair of side rails 35 which are fastened to the remote sides of the frame F by means of suitable fasteners, e.g., bolts 37. It will be appreciated that other suitable fastening devices are within the contemplation of the invention.

The termini of each side rail is formed with an outwardly extending flange 39, and secured to and extending transversely between the flanges 39 is a transverse locking bar in the form of a length of square tubing 42. In order to strengthen the tubing 42, gussets 44 are welded, or otherwise fixed between the flanges 37 and the tubing 42. It will be seen that the face of each flange 37 is disposed at an acute angle relative to the horizontal side rails 35, thereby situating the locking bar at the same acute angle.

The companion component to that of the male component 33 completes the coupling assembly of the present invention, and that is the female component 46, seen in some detail in FIG. 8. The female component 46 is comprised of a plate 48, affixed, in some suitable fashion, to the forward end of the box frame 22 of the dolly 20. The plate 48 is mounted so as to be inclined at the same acute angle as the flanges 37.

Figure 9:
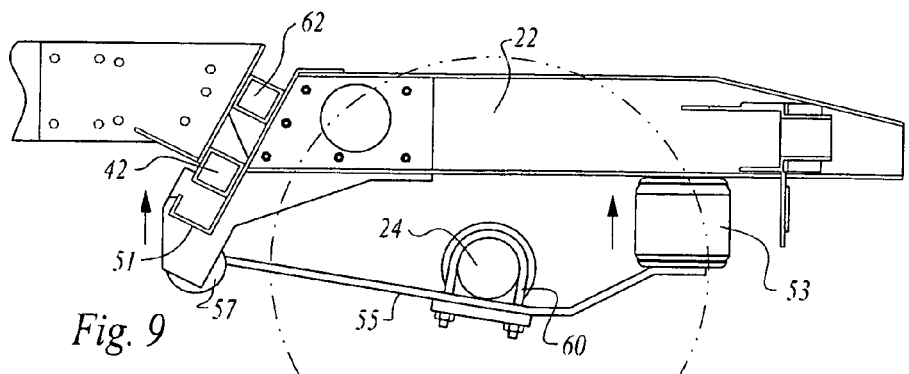
FIGS. 9, 10 and 11 are similar to FIG. 8, except the components of the mounting system have come together and the air bags are inflated to secure those elements in a locked position.
Figure 10:
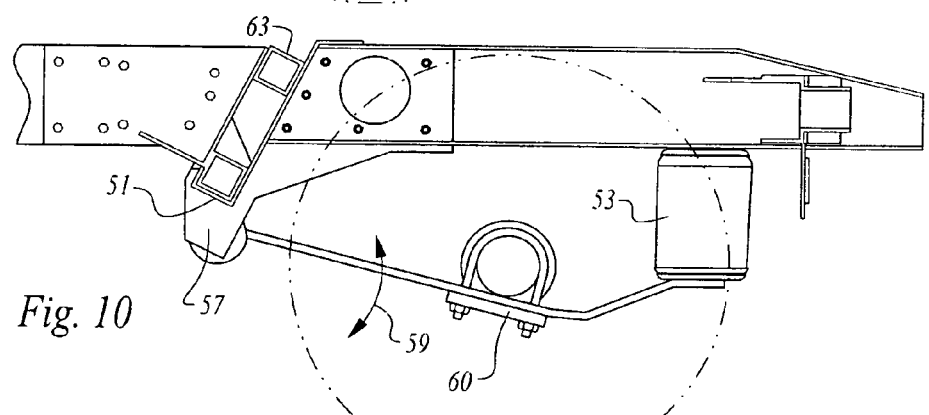
Figure 11:
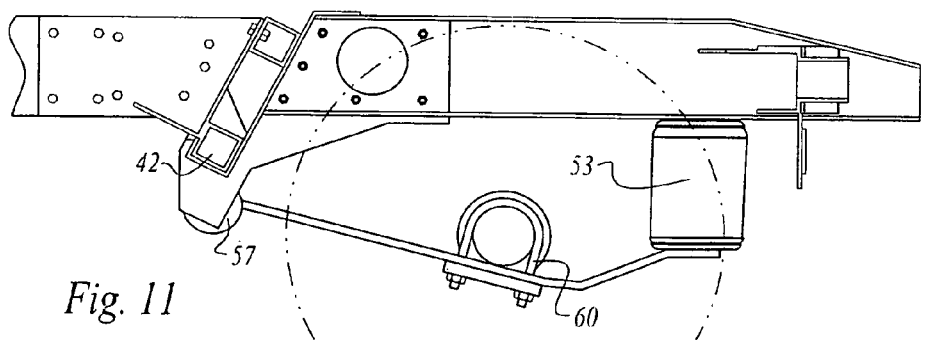

In order to receive and assure a secure a connection between the tractor and the dolly, the plate 48 is formed, or otherwise provided, with a transverse channel 51. The channel 51 is expressly sized to selectively receive and nest the tube 42. Referring to FIGS. 9, 10 and 11, a sequential depiction is provided to a tractor hooking up to a dolly constructed in accordance with the present invention.

Initially, it will be noted that the dolly 20 is equipped with an air bag suspension. To this end, and in keeping with the objectives of the invention, air bags 53 are provided rearwardly of the dolly's axle 24, on either side of the dolly where they are secured between the frame 22 and a strap 55. The strap 55 is pivotally mounted at its forward end 57, and tied to the axle 24 in one of several well known manners, e.g., "U" bolts 60. The "U" bolt acts as a fulcrum which permits the strap to move in a limited arc as indicated by the arrows 59 as the air bags are actuated. The suspension system is so configured as to provide some element of shock absorption and, further, to elevate the frame 22 on the axle 24 upon inflation of the air bags 53, which is accomplished in a well known manner by the tractor's air pressure system.

As seen in FIG. 9, the tractor is either backed into contact with the plate 48, or alternatively, the dolly is manually manipulated into position behind the tractor and then pushed toward the tractor until the plate 48 is in contact with the tube 42, which is situate immediately above the channel 51. Once in contact, the appropriate air hoses are connected [not shown], air is injected into the air bags 53, resulting in the forward end of the frame 22 of the dolly being raised, causing the tube 42 to be firmly nested in the channel 51, and thereby securing the connection. Further, in keeping with the invention, a spacer 62 is provided and, as shown, is attached in any appropriate manner to the plate 48 where it serves to maintain proper uniform spacing between the plate and the flanges 39. The spacer 62 is identical in depth and length to the tubing 42 so that when the dolly is engaged with the male component of the tractor, the spacial relationship between the plate 48 and the flanges 39 is maintained over the entire surface of the plate as determined by said locking bar.

As a consequence of the foregoing structure, a tractor-trailer rig is easily hooked up to a dolly when needed, as contrasted to a tongue and eye system of engagement where the tongue has to be artificially restrained from moving around.

Moreover, the engagement system of the present invention provides a broad area of control which makes the dolly, so engaged, pull evenly in the direction of movement of the tractor, with minimal to no sway or deflection.

It is also evident that the driver of the tractor can easily maneuver into position for engagement with the dolly, and the substantial contact with the dolly results in a positive feel with the dolly totally under control.

Finally, by, e.g., mounting a fifth wheel on the dolly frame and providing engagement at the rear of the trailer, the dolly permits a second trailer, or pup, to be engaged with the tractor-trailer rig, providing many of the same advantages already articulated for the dolly.

It will be appreciated that some variation in the specific structure described will occur to those skilled in the art. However, such variations are within the contemplation of the invention as described in the following claims, wherein:

The invention claimed is:

1. In combination with a tractor trailer rig in which the tractor includes a frame and has at least one rear axle, a dolly; said dolly having a frame, and said frame mounted on an axle supported by wheels;

said dolly being selectively fastened to said tractor; a coupling assembly for securing said dolly to said tractor; said coupling assembly having components affixed respectively to said tractor frame and said dolly;

said coupling assembly including a transverse locking bar, said locking bar being attached to said tractor frame and disposed at an acute angle relative to the direction of travel of said tractor trailer rig;

said coupling assembly further including a plate mounted transverse to the direction of movement of said dolly and secured to the forward end of said dolly; said plate being disposed at an acute angle relative to the direction of travel, said plate including a transverse channel, said channel being sized to receive said locking bar in nesting relation;

said dolly including an air bag suspension, said air bag suspension system adapted to raise at least a portion of said frame of said dolly when said air bags are inflated, so as to engage the components of said coupling assembly.

2. The combination set forth in claim 1, wherein said coupling assembly includes a pair of spaced flanges secured to the frame of said tractor, said flanges supporting said locking bar.

3. The combination set forth in claim 2, wherein said suspension system includes at least one air bag;

a strap, said strap extending between said air bag and attachment to said frame of said dolly, said strap being tied to said axle between said air bag and said attachment to said frame, and being operative to raise the forward end of said dolly when said air bag is expanded.

4. The combination set forth in claim 3, wherein the raising of said forward end of said dolly results in the nesting of said locking bar in said transverse channel to thereby couple said dolly to said tractor.

5. The combination set forth in claim 2, wherein said flanges support said locking bar at an acute angle relative to the direction of travel of said tractor.

6. The combination set forth in claim 1, wherein said locking bar and said plate are disposed at the identical acute angle relative to the direction of travel of said tractor trailer rig.

7. The combination set forth in claim 6, wherein a spacer is provided to maintain the spacial relationship between the components of said coupling assembly.

8. The combination set forth in claim 7, wherein said spacer is of the same size as said locking bar.

\* \* \* \* \*